US009212706B2

(12) United States Patent
Vogel et al.

(10) Patent No.: US 9,212,706 B2
(45) Date of Patent: Dec. 15, 2015

(54) RETROFIT ASSEMBLY AND METHOD FOR INSTALLING A HYDRAULIC DRIVE MOTOR TO A PRESSURIZED VESSEL

(71) Applicant: Andritz Inc., Glens Falls, NY (US)

(72) Inventors: Keith Vogel, Queensbury, NY (US); Tim Pease, South Glens Falls, NY (US)

(73) Assignee: Andritz Inc., Glens Falls, NY (US)

( * ) Notice: Subject to any disclaimer, the term of this patent is extended or adjusted under 35 U.S.C. 154(b) by 0 days.

(21) Appl. No.: 14/336,444

(22) Filed: Jul. 21, 2014

(65) Prior Publication Data

US 2015/0053362 A1 Feb. 26, 2015

Related U.S. Application Data

(60) Provisional application No. 61/868,075, filed on Aug. 20, 2013.

(51) Int. Cl.

| *D21F 1/00* | (2006.01) |
|---|---|
| *F16D 33/18* | (2006.01) |
| *D21C 7/00* | (2006.01) |
| *F03C 1/26* | (2006.01) |
| *F16C 17/10* | (2006.01) |
| *D21D 5/28* | (2006.01) |

(52) U.S. Cl.
CPC *F16D 33/18* (2013.01); *D21C 7/00* (2013.01); *F03C 1/26* (2013.01); *F16C 17/10* (2013.01); *D21D 5/28* (2013.01)

(58) Field of Classification Search
USPC .................................................. 162/244, 32
IPC ........................................................ D21F 1/00
See application file for complete search history.

(56) References Cited

U.S. PATENT DOCUMENTS

| 6,368,453 | B1 * | 4/2002 | Kettunen et al. ................ 162/52 |
|---|---|---|---|
| 7,846,298 | B2 | 12/2010 | Thorgersen et al. |
| 2001/0047854 | A1 | 12/2001 | Prough et al. |
| 2002/0121745 | A1 * | 9/2002 | Vogel et al. .................... 277/510 |
| 2003/0089468 | A1 * | 5/2003 | Kettunen et al. ................ 162/19 |

FOREIGN PATENT DOCUMENTS

EP 1988211 11/2008

OTHER PUBLICATIONS

Ponsaud, Phillippe, Extended European Search Report, Jan. 27, 2015, pp. 1-5, European Patent Office, Munich, Germany.

* cited by examiner

*Primary Examiner* — Mark Halpern
(74) *Attorney, Agent, or Firm* — Kerri Hochgesang; Robert Joseph Hornung (57) ABSTRACT

A hydraulic drive assembly for a large pre-existing pressurized digester vessel and a method of installation of the hydraulic drive assembly have been conceived. Such a device includes a stub shaft which has a lower end and an upper end. The lower end engages with a hydraulic drive and the upper end is coupled to a drive shaft. The coupling further includes a top coupling and a bottom coupling. The top coupling is coupled to the drive shaft, and the bottom coupling is coupled to the stub shaft. A drive support bracket is attached to the hydraulic drive and then attached to the drive support bracket by at least one sole plate that is fixed to a foundation. The hydraulic drive assembly installation method is utilized when removing an electric motor and mechanical transmission device and replacing it with a hydraulic drive assembly.

9 Claims, 7 Drawing Sheets

RETROFIT ASSEMBLY AND METHOD FOR INSTALLING A HYDRAULIC DRIVE MOTOR TO A PRESSURIZED VESSEL

RELATED APPLICATION

This application claims priority to and incorporates by reference U.S. provisional application Ser. No. 61/868,075, filed Aug. 20, 2013.

TECHNICAL FIELD

This disclosure relates to pressurized digester vessels (also referred to as pressure vessels which include, but are not limited to, digester vessels, reactor vessels, etc.) having rotating or otherwise moving internal components driven by a drive shaft extending out of the pressurized digester vessel to a transmission device and motor drive mechanism. In particular, this disclosure relates to fitting a hydraulic drive mechanism to a drive shaft of an existing pressure vessel replacing a transmission device and motor with a hydraulic drive.

BACKGROUND OF THE INVENTION

The pulp and paper industry, as well as other process industries, employs chemical reactions in processes that are often performed in vessels under pressures greater than atmospheric pressure. Such vessels are referred to as pressure vessels. Typically, these processes are performed within pressure vessels that maintain the product at predetermined super-atmospheric pressures and at elevated temperatures which promote the desired chemical reaction. Continuous or batch pulp digester vessels are examples of pressure vessels within which chemical reactions are performed under elevated pressures and temperatures to produce pulp from lignocellulosic material, including but not limited to wood chips, comminuted cellulosic material, biomass, etc.

The processes being performed often require agitation or stirring of the lignocellulosic material in the pressurized digester vessel, especially during a chemical reaction. Such agitation or stirring could also assist in the discharge of treated material from the digester vessel while the lignocellulosic material is under pressure and at elevated temperatures. The agitation is typically effected by a shaft-driven agitator. An electric motor drives the shaft via a power transfer device, such as a transmission, which may include belts, drive chains and a gear reducer. Hydraulic drive systems for vessels are described in U.S. Pat. No. 7,846,298. Hydraulic devices are good for slow rotation applications, such as low rpm (revolutions per minute) and high torque applications. These applications include stirring devices for continuous digester vessels.

Hydraulic drive systems were previously fixed directly to the housing of an existing pressurized digester vessel. Typically, a bell housing at the bottom of the digester vessel provided a mount for the housing of the hydraulic drive system. The coupling between the housings resulted in significant torsional loads being applied to the housing of the pressurized digester vessel. Further, attaching the housing of a hydraulic drive to older digester vessels was difficult because the equipment, such as an outlet device of a digester vessel is formed of iron and cannot be modified by welding i.e., modified by welding an adapter flange.

Adding a hydraulic drive system to an existing pressurized digester vessel, originally having a gearbox, speed reducer, or other mechanical transmission device, typically required configuring the housing of either the hydraulic drive system, the bell housing, or another appropriate system. The configuration would take place at the bottom of the pressurized digester vessel and ensure the housings could be fastened together. Such fastening is important as the original pressurized digester vessels were typically made out of materials where welding could not be utilized. Further, the outlet device drive shaft typically had to be configured to conform to the hydraulic drive which often required a new shaft. In addition, the foundation below the pressurized digester vessel, which supports the mechanical transmission and motor assembly, had to be manipulated or otherwise removed in connection with the removal of the mechanical transmission and motor assembly. Such manipulation would require significant resources and expense in order to appropriately alter the foundation without damaging the integrity of the foundation, as this is the foundation for the digester vessel.

What is needed is a hydraulic drive assembly capable of providing the desired rpm and torque necessary to power a digester, while being mounted to a non-weldable surface. Such an assembly could be inserted into the already-existing foundation envelope and mounted to the non-weldable surfaces of the digester and attached to the sole plates. Such a system would have the advantage of providing adequate rpm and torque while improve safety factors and reduce system breakdown. In addition, hydraulic drive systems and the resulting mounting assembly could result in a reduction of area used in the foundation envelope allowing the unused space to be used to maintain the hydraulic drive assembly.

BRIEF DESCRIPTION OF TINE INVENTION

A hydraulic drive assembly related to large, pre-existing pressurized vessels has been conceived. Such a device can be utilized when welding new or additional components is not an option. The conceived apparatus includes a stub shaft with a lower end engaged to a hydraulic drive, and an upper end coupled to a drive shaft. The lower end of the stub shaft is rotated by the hydraulic drive which in turn rotates the drive shaft. The drive shaft in turn rotates the bottom scrapper of the pressurized digester vessel. The coupling includes a top coupling attached to the drive shaft and a bottom coupling attached to the stub shaft and corresponding coupling drive rings. The coupling ensures that the drive shaft and the stub shaft are connected and the torque resulting from the hydraulic drive is appropriately administered so as to prevent damage to the pressurized digester vessel. Additionally, a drive support bracket is attached to the hydraulic drive. The drive support bracket holds the hydraulic drive and prevents rotation and transmits torsional forces from the hydraulic drive to the foundation. Within the foundation is an envelope where the original electric motor, mechanical transmission device, and sole plates were located. The electric motor and mechanical transmission device were fixed to the sole plates and the sole plates fixed to the foundation. The sole plates, fixed to the foundation, remain after the electric motor and mechanical transmission devices are removed. In the hydraulic drive assembly configuration at least one sole plate should be attached to the drive support bracket to prevent rotation of the drive support bracket One embodiment of the apparatus could include a hydraulic drive assembly where the drive support bracket has an upper annular mounting ring and a lower annular mounting ring. The upper annular mounting ring may be attached to the hydraulic drive. The drive support bracket could also have a base that is positioned between the lower annular mounting ring and the upper annular mounting ring lending support to the overall drive support bracket. The lower annular mounting ring is located on the bottom of the hydraulic drive and is fastened to the sole plates. The drive support bracket may also include a plurality of bolt holes on both the upper and the lower annular mounting rings. The bolt holes on the upper annular mounting ring provide places to fix the hydraulic drive to the drive support bracket; while bolt holes in the lower annular mounting ring allow the hydraulic drive to be fixed to the sole plates.

Additional embodiments could include at least one access opening on the drive support bracket. These access openings are located on the base, for example, between the lower annular mounting ring and the upper annular mounting ring lending support to the overall drive support bracket. The access openings provide openings to the hydraulic drive for tubes to be fixed to the hydraulic motor and openings for maintenance. Various embodiments may also include a spline drive on the stub shaft that communicates with the hydraulic drive. Another embodiment could include the stub shaft having a key slot. A key slot ensures the stub shaft is still able to turn the drive shaft even if the coupling were to slip. The top coupling attached to the drive shaft can belong to the original electrical motor and mechanical transmission device setup, but depending on the situation it may be appropriate to use a new top coupling. While the previously described embodiments allow for no adaptation to the foundation of a pre-existing device system, the foundation can be altered or replaced to best fit the particular needs. In addition, while sole plates are a part of the mechanical pre-existing system, one or more sole plates can be replaced, or one or more of the pre-existing sole plates can be used. In addition, sole plates can come in various sizes and may be pre-existing. Sole plates could include at least one bolt anchor. Bolt anchors may protrude from the sole plate and may be used to bolt the drive support bracket to the sole plates and the foundation.

A method of replacing a transmission device and motor for a pressurized vessel with a hydraulic drive includes removing a mechanical transmission device and electric motor from under a pressurized vessel. By removing the mechanical transmission there is now a large space where a new drive could be placed. A hydraulic drive must then be selected that has sufficient torsional capacity to drive a bottom scraper device in the pressurized digester vessel. The selected device should be of a size small enough to fit under the pressurized vessel. Stub shafts, used to connect the hydraulic drive to the drive shaft, are typically custom-made. Therefore, a stub shaft as well as the drive support bracket should be designed for the pressurized vessel and the hydraulic drive. The stub shaft should then be inserted into an opening of the hydraulic drive. The hydraulic drive may be bolted to an upper annular mounting ring of the drive support bracket. The hydraulic drive, the stub shaft, and the drive support bracket may be assembled, creating the hydraulic drive assembly. The hydraulic drive assembly may then slide along existing fastening device(s), such as sole plates, on the foundation, into the existing foundation envelope, until the stub shaft is aligned with the drive shaft to allow for coupling of the stub shaft to the drive shaft, often with existing couplings. The bottom coupling communicates with the stub shaft and the top coupling communicates with the drive shaft; fastening the two together. The lower annular mounting ring of the support bracket is then fastened to the sole plates, possibly with bolt anchors Various features may be included with various embodiments of the assembly and method disclosed herein. Such an assembly and method of installing a hydraulic drive could be performed without the need to remove or dig into the foundation, and could be performed without attaching a housing or other components to a side wall of the pressurized vessel. While alternations could be made to the foundation, this is an additional cost saving benefit.

DETAILED DESCRIPTION

In the following detailed description, reference is made to the accompanying drawings that show by way of illustration specific example embodiments in which the present teaching may be practiced. These embodiments are described in sufficient detail to enable those skilled in the art to practice the present teachings, and it is to be understood that other embodiments may be utilized and changes may be made without departing from the scope of the present teachings. The following description is purely illustrative.

Although this disclosure is described in context to what is known in the art as an "outlet device" for a continuous agitator or digester vessel, it is understood that this disclosure is applicable to any shaft that penetrates the wall of a fluid containing vessel that may be pressurized or unpressurized. The shaft may be a vertically oriented shaft and may rotate or reciprocate.

Figure 1:
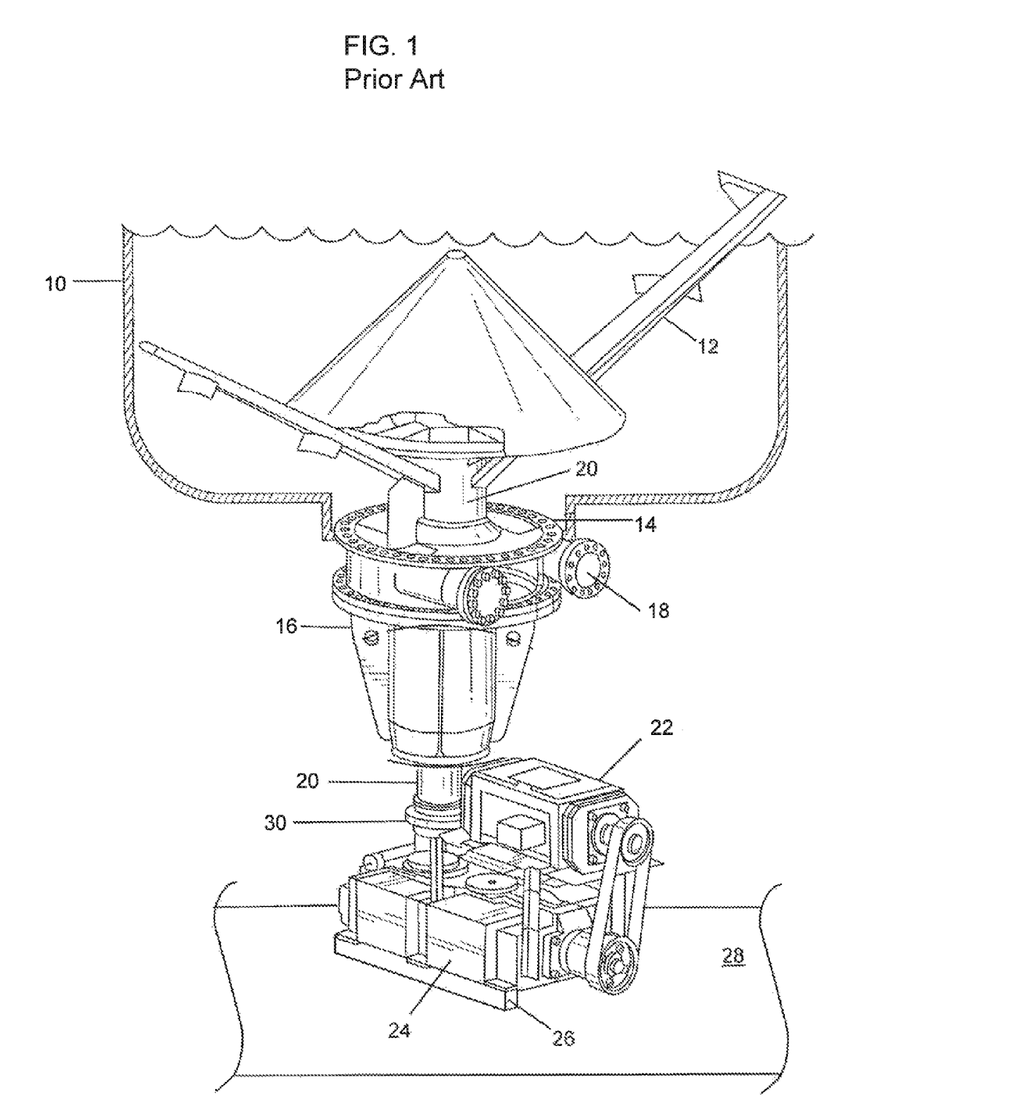
FIG. 1 is a perspective view of a conventional prior art pressurized digester vessel with drive shaft, shaft operating, and supporting components, with portions of the digester vessel cut away for clarity of illustration.

FIG. 1 illustrates a pressurized digester vessel 10, or pressurized vessel. The bottom cover 14 of a conventional continuous digester vessel 10, such as those sold by Andritz Inc. of Glens Falls, N.Y. and shown in U.S. Pat. No. 7,846,298. The pressurized digester vessel 10 could be used for the continuous chemical pulping of comminuted cellulosic fibrous material, for example, wood chips. The comminuted cellulosic fibrous material enters the top of the vessel (not shown) and passes downward as it is treated with pulping chemicals at super-atmospheric pressure, typically 1.1 barg to 20 Barg (15 to 300 psig), preferably 5 to 15 barg (70 to 220 psig), and at a temperatures greater than 100° C., typically between 130° C. and 180° C., or 120° C. and 160° C. The vertical pressurized digester vessel 10 may be generally cylindrical and have a height of over 100 feet (33 meters), a diameter of over 20 feet (7 meters), for example 20 feet to 35 feet (7 meters to 11 meters), and a capacity to continuously process over 500 tons, for example 500 tons to 5,000 tons of wood chips per day.

After the pulping reaction is essentially completed, the pulped comminuted cellulosic fibrous material is discharged from the bottom of the digester vessel 10, by means of a rotating bottom scraper device 12, mounted in the bottom cover 14 of the outlet device 16. The bottom scraper device 12 is internal to the digester vessel 10. Processed pulp and liquor flow through the interior of the bottom cover 14 and out the pulp outlet 18 at the bottom cover 14 of the digester vessel 10.

The bottom scraper device 12 is supported within the pressurized digester vessel 10 by an outlet device 16 which includes bearings to support the weight and load of the rotating device, e.g., the bottom scraper device 12, and seals to prevent leakage of process fluids from the digester vessel 10 through the outlet device 16. The outlet device 16 is below the digester vessel 10 and is attached to the bottom cover 14 of the digester vessel 10. The outlet device 16 houses a drive shaft 20 that turns the bottom scraper device 12 in the digester vessel 10.

The outlet device 16 is typically driven by an electric motor 22 via a mechanical transmission device 24, e.g., a speed reducer or gearbox. The outlet device 16 is typically driven at a final speed between 1 and 20 rpm, preferably, 5 to 15 rpm, though in other applications the drive shaft 20 rotational speed may be higher. The torque applied by the electric motor 22 and mechanical transmission device 24 is sufficient to turn or reciprocate the outlet device 16 in the slurry of cellulosic material and liquor in the bottom of the digester vessel 10.

The electric motor 22 and mechanical transmission device 24 are directly connected to the drive shaft 20 but are generally not fixed to the outlet device 16. The electric motor 22 and mechanical transmission device 24 are traditionally mounted to sole plates 26 fixed to a foundation 28, such as a concrete platform. The sole plates 26, e.g., beams embedded in the foundation 28, provide a seat supporting the electric motor 22 and mechanical transmission device 24. The coupling 30 couples drive shaft 20 to a mechanical transmission device 24 and transmits power and torque. Half of the coupling 30 couples to the mechanical transmission device 24 and the other half of coupling 30 to the drive shaft 20.

Due to innovations in the field there has been a need for increased torque and rpm to allow proper operation of the outlet device of pressurized digester vessels. Such demands have led to alterations on the existing electric motor 22 and mechanical transmission device 24. These alterations have been found to exceed existing service factors and have led to increased maintenance and equipment breakdown. Alterations, including foundation changes, would be expensive and time consuming. The inability to weld modifications to the pressurized digester vessels 10 has in the past required large, more space consuming solutions. The following could be used to alleviate the aforementioned situations and meet new industry needs. Elements identified in prior art device FIG. 1 that are common to the current device are referred to with similar identifiers. What follows is only one possible embodiment.

Figure 2:
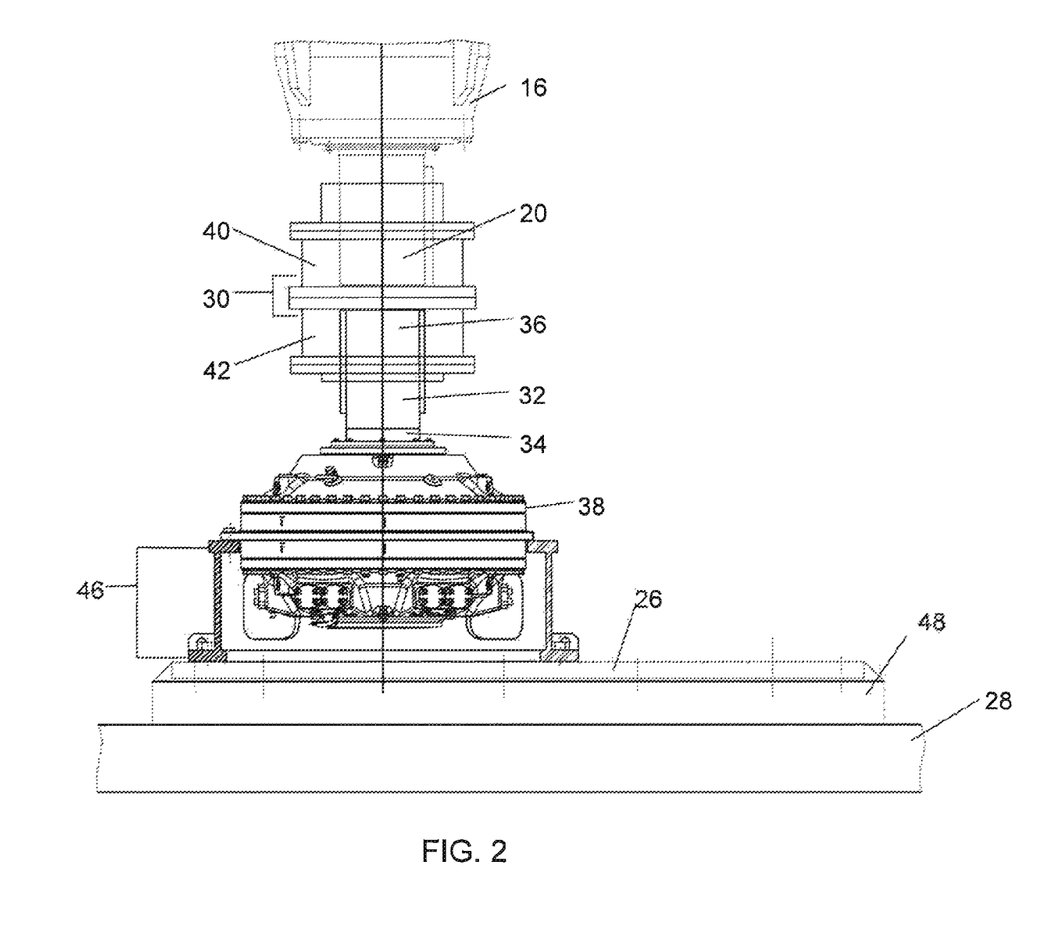
FIG. 2 is a side view of a hydraulic drive coupled to the drive shaft of a pressurized digester vessel and the drive support bracket attached to the sole plates of the pressurized digester vessel foundation.
Figure 3:
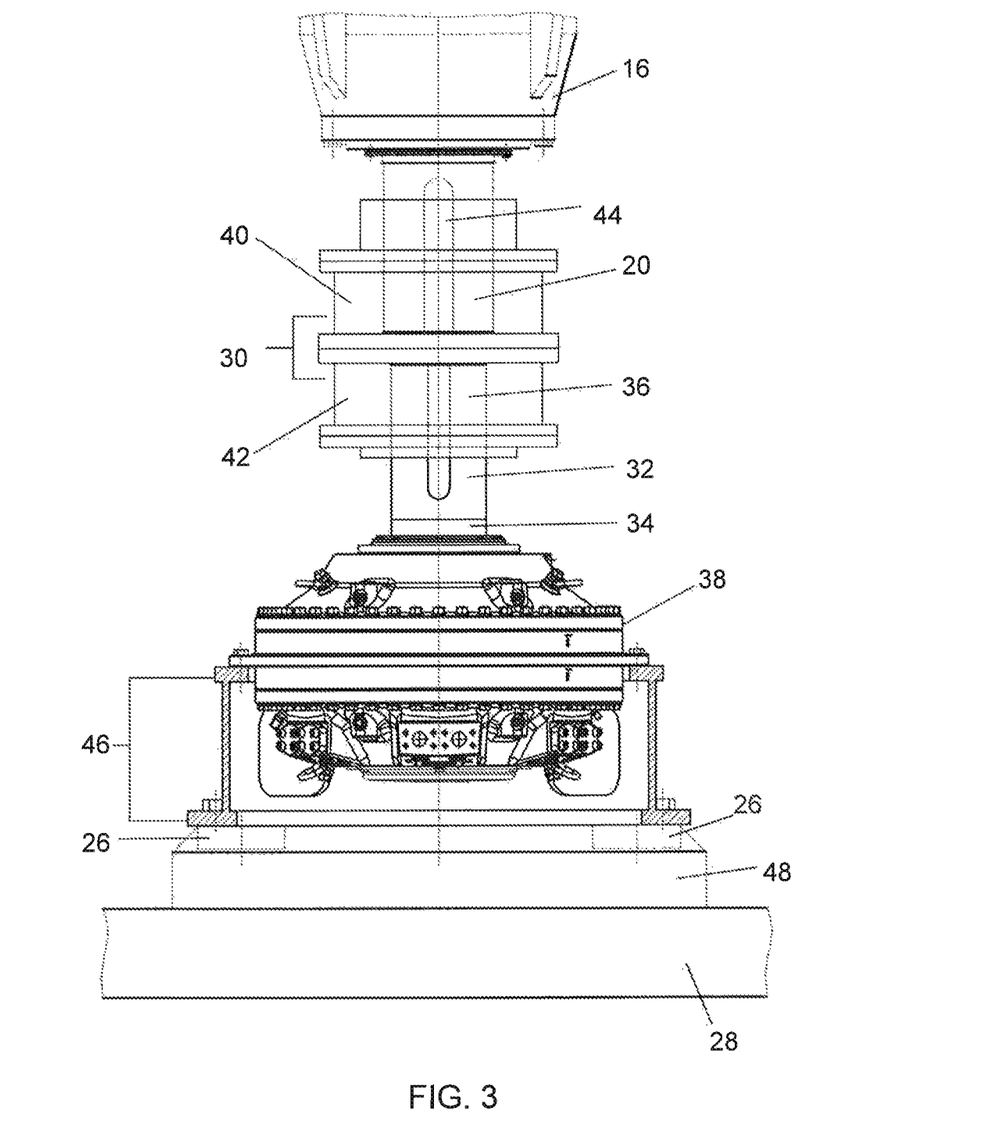
FIG. 3 is a front side view of a hydraulic drive coupled to the drive shaft of a pressurized digester vessel and the drive support bracket attached to the sole plates of the pressurized digester vessel foundation.
Figure 4:
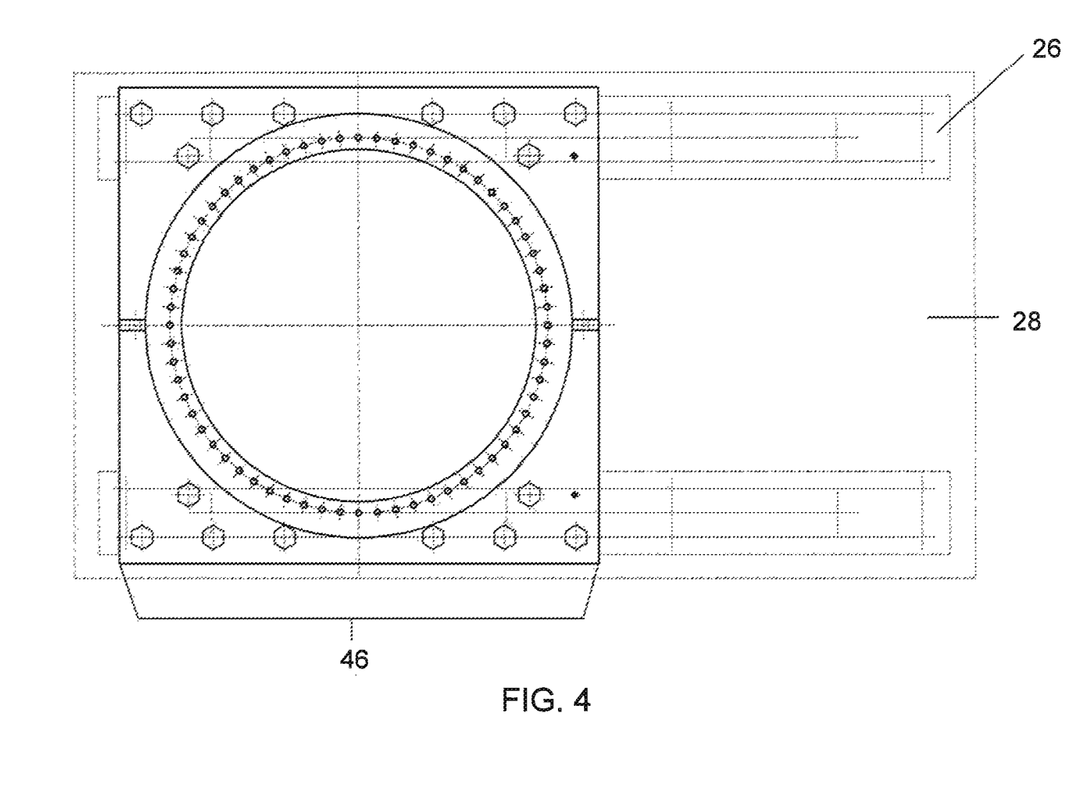
FIG. 4 is a top-down view of the drive support bracket and foundation.
Figure 5:
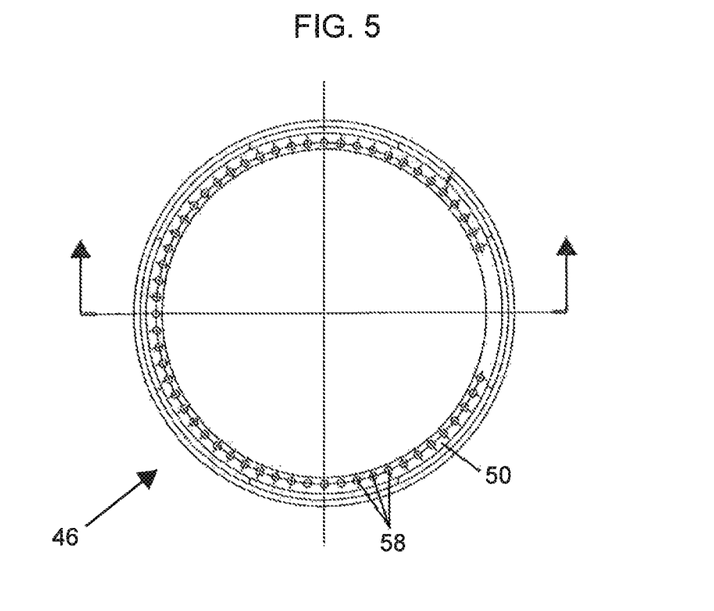
FIG. 5 is a top-down view of the drive support bracket.
Figure 6:
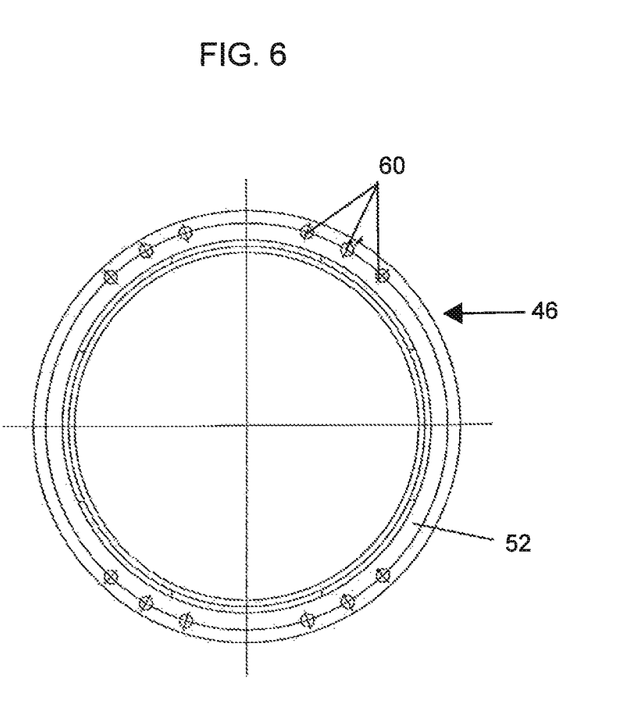
FIG. 6 is a cross-sectional view of a typical drive support bracket taken along line 6-6 of FIG. 5.
Figure 7:
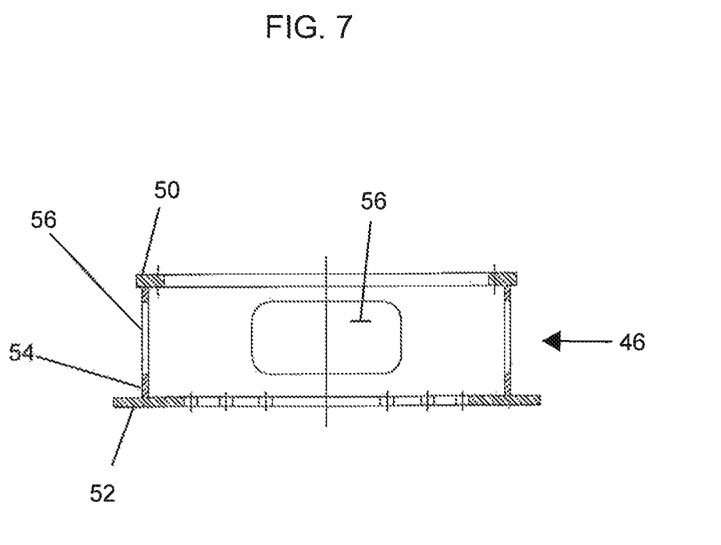
FIG. 7 is a typical bottom-up view of the drive support bracket.

FIG. 2 and FIG. 3 depict a side view and a front view, respectively, of a possible hydraulic drive assembly, in relation to a large pre-existing pressurized digester vessel 10 (Shown in FIG. 1). Illustrated in FIGS. 2 and 3 is a stub shaft 32. The stub shaft 32 has a lower end 34 and an upper end 36 and can be a variety of shapes, but can also be circular. The lower end 34 of the stub shaft 32 engages with a hydraulic drive 38 providing an interface between the hydraulic drive 38 and the pressurized digester vessel 10. The stub shaft 32 may be the only component of the hydraulic drive assembly that directly attaches to the outlet device 16 and bottom scraper device 12 (Shown in FIG. 1) within the pressurized digester vessel 10. Accordingly, the stub shaft 32 may be the only component of the hydraulic drive assembly designed or configured to couple to the outlet device 16 and bottom scraper 12 within the pressurized digester vessel 10.

The hydraulic drive 38 rotates and applies torsion to the stub shaft 32 sufficient to rotate the drive shaft 20 via the coupling 30 of the outlet device 16. The coupling could be a gear coupling or other type of coupling that could function in fastening the drive shaft 20 to the stub shaft 32. Typically, the space provided by the absence of the electric motor 22 and the mechanical transmission device 24 is rectangular (22 and 24 shown in FIG. 1). The hydraulic drive 38 may be very similar in size to the electrical motor 22 and mechanical transmission device 24 but usually the hydraulic drive 38 is physically smaller than the electric motor 22 and mechanical transmission device 24. A comparison can be seen when looking at FIGS. 2 and 3. FIGS. 2 and 3 show the foundation 28, sole plates 26, and the drive shaft 20. Because the envelope created for the original device is usually rectangular, FIG. 2 demonstrates the possible space occupied length-wise by the hydraulic assembly, and FIG. 3 demonstrates the possible space occupied width-wise by the hydraulic assembly system. Previously, the electric motor 22 and mechanical transmission device 24 filled the rectangular envelope of the foundation 28.

A hydraulic drive 38 uses a hydraulic liquid to drive hydraulic machinery, e.g., an annular array of pistons or sliding vanes, within the hydraulic drive 38. A hydraulic drive 38 may weigh substantially less, such as by more than 10,000 lbs (greater than 4,500 kilograms) less than the combined weight of the electric motor 22 and mechanical transmission device 24. While the hydraulic drive 38 takes up the space of the previous hardware, the hydraulic power unit (not shown) is outside the bottom of the pressurized digester vessel 10 and provides pressurized hydraulic liquid via hoses to drive the hydraulic drive 38. The necessary engagement between the hydraulic drive 38 and the lower end 34 of the stub shaft 32 can be accomplished by the use of splines, though other types of drives could also be utilized. The upper end 36 of the stub drive 32 is coupled, via coupling 30, to the drive shaft 20 of the outlet device 16. The coupling 30 can be made of two pieces, a top coupling 40 that couples to the drive shaft 20 and a bottom coupling 42 that couples to the upper end 36 of the stub shaft. The coupling 30 connects the drive shaft 20 and stub shaft 32 together.

Another implementation could include the stub shaft 32 having a key slot 44 that is shaped and sized to match into a key slot in a bottom coupling 42. The hydraulic drive 38 is attached to a drive support bracket 46. The drive support bracket 46 may have a custom height that is appropriate for the desired application. The drive support bracket 46 is attached to at least one sole plate 26, which is fastened to the foundation 28. Between the underside of the sole plate(s) 26 and the top surface of the foundation 28, there may be grout with concrete or other appropriate material. Such material is identified in FIGS. 2 and 3 with identifier 48. Such material may belong to the original mechanical transmission system setup.

FIGS. 2-7 illustrate a possible embodiment of a hydraulic drive 38 coupled to a drive shaft 20. A hydraulic drive 38 can be supported by the drive support bracket 46. The drive support bracket 46, which is attached to the hydraulic drive 38, can prevent rotation and transmits torsional forces from the hydraulic drive 38 to the foundation 28 (ground). The drive support bracket 46 and the stub shaft 32 may be the only components of the hydraulic drive assembly that are custom made for particular pressurized digester vessel 10. The hydraulic drive 38 may be selected from standard drive models offered by a drive manufacturer. The top coupling 40 to the drive shaft 20, sole plates 26, and foundation 28 may exist at the site of the pressurized digester vessel 10 and be reused for the hydraulic drive assembly.

One of the following features may be included. One implementation could include a hydraulic drive assembly where the drive support bracket 46 has an upper annular mounting ring 50 and a lower annular mounting ring 52. These two mounting rings could be made of various materials appropriate for supporting a hydraulic drive 38. The drive support bracket 46 could also have a base 54 that is positioned between the upper annular mounting ring 50 and the lower annular ring 52. The base 54 could be connected to the upper and lower annular mounting rings 50 and 52 a variety of ways, such as by fastening, bolting, or welding. The base 54 may be formed of a metal plate having a sufficient thickness to provide torsional and structural support for the hydraulic drive 38. Additional implementations could include at least one access opening 56 on the drive support bracket 38, this could be found on the base 54. Access openings 56 could provide openings through which technicians may enter to service the hydraulic drive 38 and for the hydraulic hoses (not shown) to be connected to the hydraulic motor (not shown).

The drive support bracket 46 may also include a plurality of bolt holes 58 on the upper annular mounting ring 50 and a plurality of bolt holes 60 on the lower annular mounting ring 52. The bolt holes 58 on the upper annular mounting ring 50 may extend at least most of the circumference of the upper annular mounting ring 50. These bolt holes 58 can be used to fasten or bolt the hydraulic drive 38 to the drive support bracket 46. The bolt holes 58 receive bolts that fasten the housing of the hydraulic drive 38 to the upper annular mounting ring 50 of the drive support bracket 46. The bolt holes 58 may be more than a dozen, but the number is selected based on the torsional and structural support needed for the hydraulic drive 38. The lower annular mounting ring 52 can be fastened to the sole plates 26 that are able to be embedded in the concrete foundation 28 via bolt holes 60. The shape of the upper and lower annular mounting rings 50 and 52 may be rectangular, circular, or any other appropriate shape that conforms to the housing of the hydraulic drive 38 and the sole plates 26.

Various implementations of the sole plate 26 could include at least one anchor bolt (not shown). Anchor bolts could be used to anchor the lower annular mounting ring 52 to the sole plates and foundation using the bolt holes 60. It is possible that the top coupling 40, the foundation 28, and the sole plate 26 may pre-exist from an original setup with an electric motor 22 and mechanical transmission device 24. At least one sole plate 26 must be used. It is also possible that each of these elements could be replaced or altered in a way that better accomplishes the hydraulic drive assembly setup.

The foot print (see FIG. 4) of the hydraulic drive 38 with drive support bracket 46 may be substantially shorter than the footprint of the mechanical transmission device 24 and electric motor 22 being replaced. The sole plates 26 originally designed for the mechanical transmission device 24 and electric motor 22 may be substantially longer, e.g., twice the length, of the diameter or length of the hydraulic drive 38. This increase in space and orientation of elements could provide a method of replacing a mechanical transmission device 24 and electric motor 22 for a pressurized digester vessel 10 with a hydraulic drive 38.

A method for installing a hydraulic drive assembly could include the following: removing the electric motor 22 and mechanical transmission device 24 from under a pressurized digester vessel 10, then selecting a hydraulic drive 38. The selected hydraulic drive 38 requires sufficient torsional capacity to drive a bottom scraper device 12 in the pressurized digester vessel 10. In addition, such a hydraulic drive 38 must be a size small enough to fit under the pressurized digester vessel 10. Stub shafts 32 are often custom made. To use a stub shaft 32 would require designing a stub shaft 32 where the lower end 34 fits into the hydraulic drive 38 and the upper end 36 interacts with the drive shaft 20 via a coupling 30. Designing, a drive support bracket 46 for the pressurized digester vessel 10 and the hydraulic drive 38 is also necessary, as pressurized digester vessels 10 may require different equipment specific to the vessel's purpose that requires machine specific measurements.

Once designed, the lower end 34 of the stub shaft 32 should be inserted into an opening of the hydraulic drive 38. The hydraulic drive 38 is then bolted to an upper annular mounting ring 50 of the drive support bracket 46. The hydraulic drive 38, the stub shaft 32, and the drive support bracket 46 should be assembled. Once assembly is complete, the hydraulic drive assembly is slid along an existing fastening device, such as sole plates 26, on the foundation 28 until the stub shaft 32 is aligned with the drive shaft 20. As previously discussed, the sole plates 26 and the foundation 28 can be from the original electric motor 22 and mechanical transmission device 24. Once the stub shaft 32 is aligned with the drive shaft 20, the two shafts are coupled together at the coupling 30 where the bottom coupling 42 communicates with the stub shaft 32 and the top coupling 40 communicates with the drive shaft 20. The top coupling 40 could belong to the original electric motor 22 and mechanical transmission device 24 system. If the original top coupling 40 is used, this would eliminate the need to find or custom design a coupling half to fit the existing drive shaft 20. However, it is also possible to have a new top coupling 40 to match the bottom coupling 42 of the stub shaft 32. The hydraulic drive assembly is then fastened the foundation via the lower annular mounting ring 52 of the drive support bracket 46 to the sole plates 26. This can be achieved by using anchor bolts found within the foundation 28 and the sole plates 26.

Various features may be included in the method of installation of a hydraulic drive assembly. Such a method of installing a hydraulic drive 38 could be practiced without having to remove or dig into the foundation 28 and could be practiced without attaching a housing or other components to a side wall of the pressurized digester vessel 10. Not having to attach a housing or other components directly to a pressurized digester vessel 10 allows for the hydraulic drive assembly to be utilized in conditions where the method of attaching the device, such as welding, is limited or impossible.

While preferred embodiments have been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:
1. A hydraulic drive assembly comprising:
a pre-existing pressurized digester vessel having an outlet device;
a hydraulic drive;
a stub shaft wherein the stub shaft has a lower end and an upper end, wherein the lower end engages a hydraulic drive, wherein the upper end is coupled to a drive shaft of the outlet device of the pre-existing pressurized digester vessel;

a coupling further comprising a top coupling and a bottom coupling, wherein the top coupling is coupled to the drive shaft, wherein the bottom coupling is coupled to the stub shaft;

a drive support bracket wherein the drive support bracket is attached to the hydraulic drive; and a pre-existing sole plate, wherein the pre-existing sole plate is attached to the drive support bracket, and wherein the sole plate is fixed to a pre-existing foundation.

2. The hydraulic drive assembly of claim 1, wherein the drive support bracket further comprises an upper annular mounting ring and a lower annular mounting ring.

3. The hydraulic drive assembly of claim 2, wherein the drive support bracket further comprises a base, wherein the base is positioned between the lower annular mounting ring and the upper annular mounting ring.

4. The hydraulic drive assembly of claim 2, wherein the upper annular mounting ring and the lower annular mounting ring further comprise a plurality of bolt holes.

5. The hydraulic drive assembly of claim 1, wherein the drive support bracket further comprises at least one access opening.

6. The hydraulic drive assembly of claim 1, wherein the stub shaft further comprises a spline drive, and wherein the spline drive communicates with the hydraulic drive.

7. The hydraulic drive assembly of claim 1, wherein the stub shaft further comprises a key slot.

8. The hydraulic drive assembly of claim 1, wherein the top coupling is pre-existing.

9. The hydraulic drive assembly of claim 1, wherein the sole plate further comprises at least one anchor bolt.

\* \* \* \* \*